Figure 7:
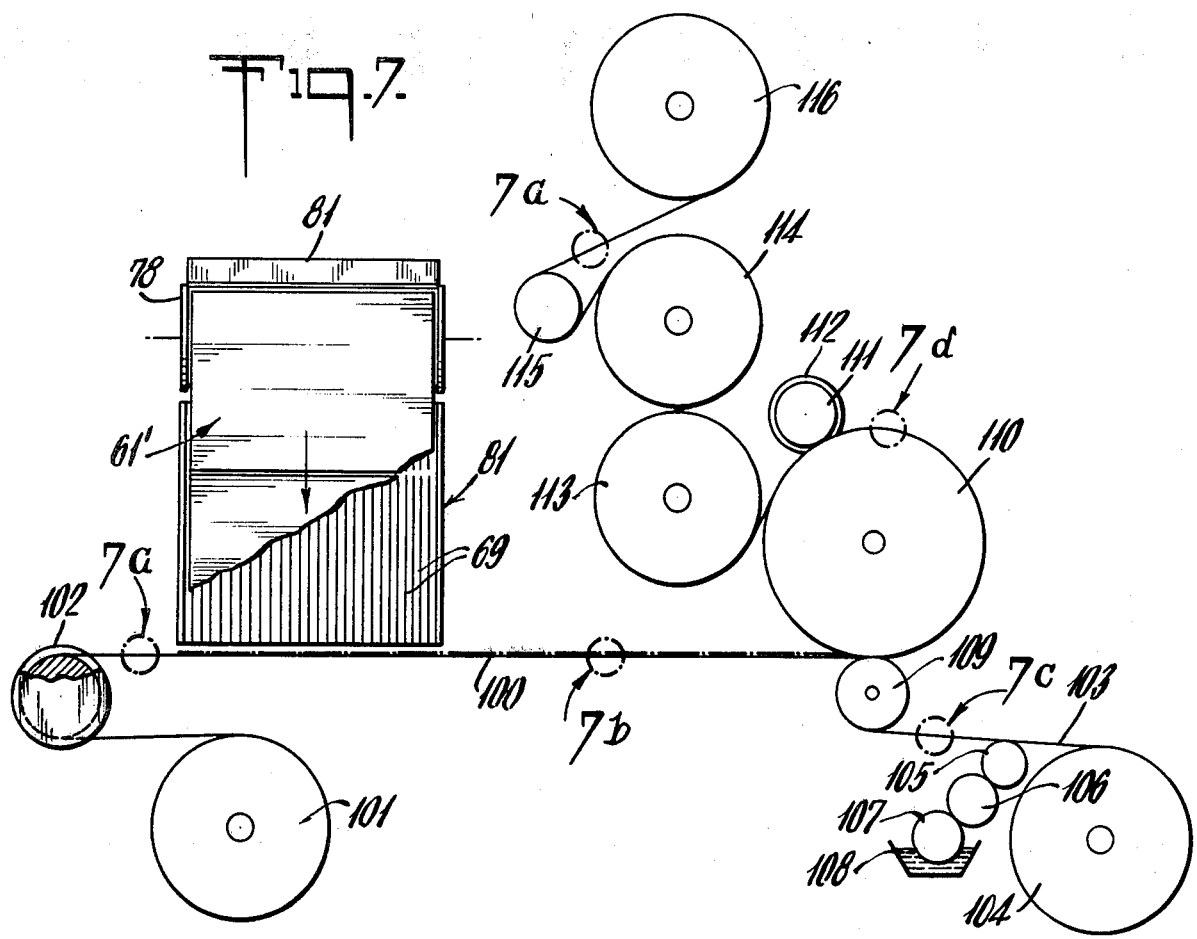
Figure 7A:
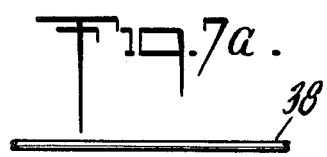
Figure 7B:
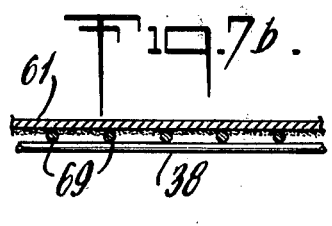
Figure 7D:
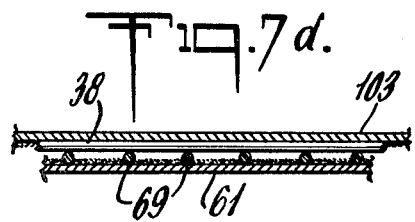
Figure 7C:
Figure 7E:
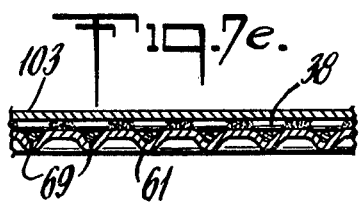

United States Patent [19]

Chavannes

[11] 4,203,790
[45] May 20, 1980

[54] METHOD OF FORMING WIRE REINFORCED CORRUGATED BOARD

[76] Inventor: Marc A. Chavannes, 4044 Roberts Point, Sarasota, Fla. 33581

[21] Appl. No.: 599,142

[22] Filed: Jul. 25, 1975

[51] Int. Cl.² ............................................. B31F 1/24
[52] U.S. Cl. ................... 156/179; 156/206; 156/210; 156/266; 156/456; 156/470
[58] Field of Search ............... 156/178, 179, 210, 211, 156/297, 292, 298, 300, 79, 264, 265, 266, 177, 206, 205, 176, 182, 470, 471, 436; 428/107, 109, 285, 295, 114, 181, 182, 184, 186, 314, 310, 311

[56] References Cited

U.S. PATENT DOCUMENTS

| 958,450 | 5/1910 | Wardell | 428/182 |
|---|---|---|---|
| 2,290,386 | 7/1942 | Schindler | 156/352 |
| 2,763,586 | 9/1956 | Noyes | 428/182 |
| 3,188,813 | 6/1965 | Foster et al. | 428/182 |
| 3,250,655 | 5/1966 | Adler | 156/265 |
| 3,364,094 | 1/1968 | Rösler | 156/440 |
| 3,508,992 | 4/1970 | Chavonnes | 156/209 |
| 3,562,083 | 2/1968 | Schroder | 428/184 |
| 3,578,544 | 5/1971 | Thorsrud | 156/79 |
| 3,591,434 | 7/1971 | Hartstein | 156/176 |
| 3,674,620 | 7/1972 | McCarthy et al. | 156/179 |
| 3,679,537 | 7/1972 | Huer et al. | 156/205 |
| 3,687,764 | 8/1972 | Rogosch et al. | 156/179 |
| 3,709,764 | 1/1973 | Thomas | 156/179 |
| 3,811,987 | 5/1974 | Wilkinson et al. | 156/210 |
| 3,886,019 | 5/1975 | Wilkinson et al. | 156/210 |

FOREIGN PATENT DOCUMENTS 187005  7/1807  Fed. Rep. of Germany ........... 428/184

Primary Examiner—Michael W. Ball
Attorney, Agent, or Firm—Lerner, David, Littenberg & Samuel

[57] ABSTRACT

Wire reinforced paper products wherein wires are affixed to a paper layer or included within a paper structure with at least one paper layer conforming to the contour of the wires to supplement the rigidity produced by the wires and a corrugated paper structure including wires disposed therein. The paper products are manufactured in continuous processes which enable the use of one or two sets of parallel wires, the latter producing a wire grid structure. In the manufacture of corrugated structures one or two sets of wires may be included in the corrugated portion and the overlying layer or layers and in so doing the structural strength and moisture resistant characteristics of the resultant corrugated board may be increased several fold without materially increasing the cost of the board as compared with board using relatively heavy paper in order to achieve increased strength.

10 Claims, 46 Drawing Figures

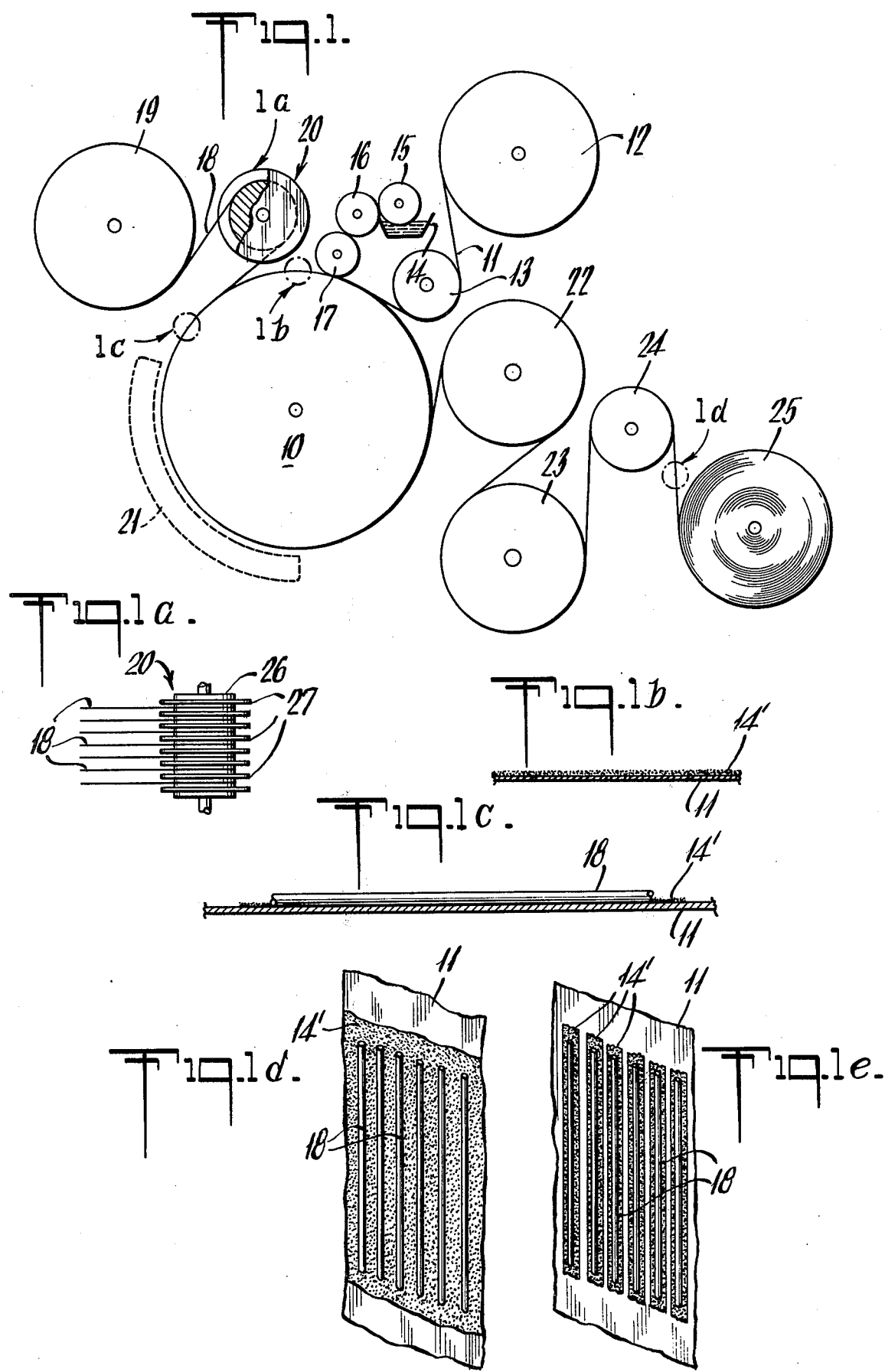

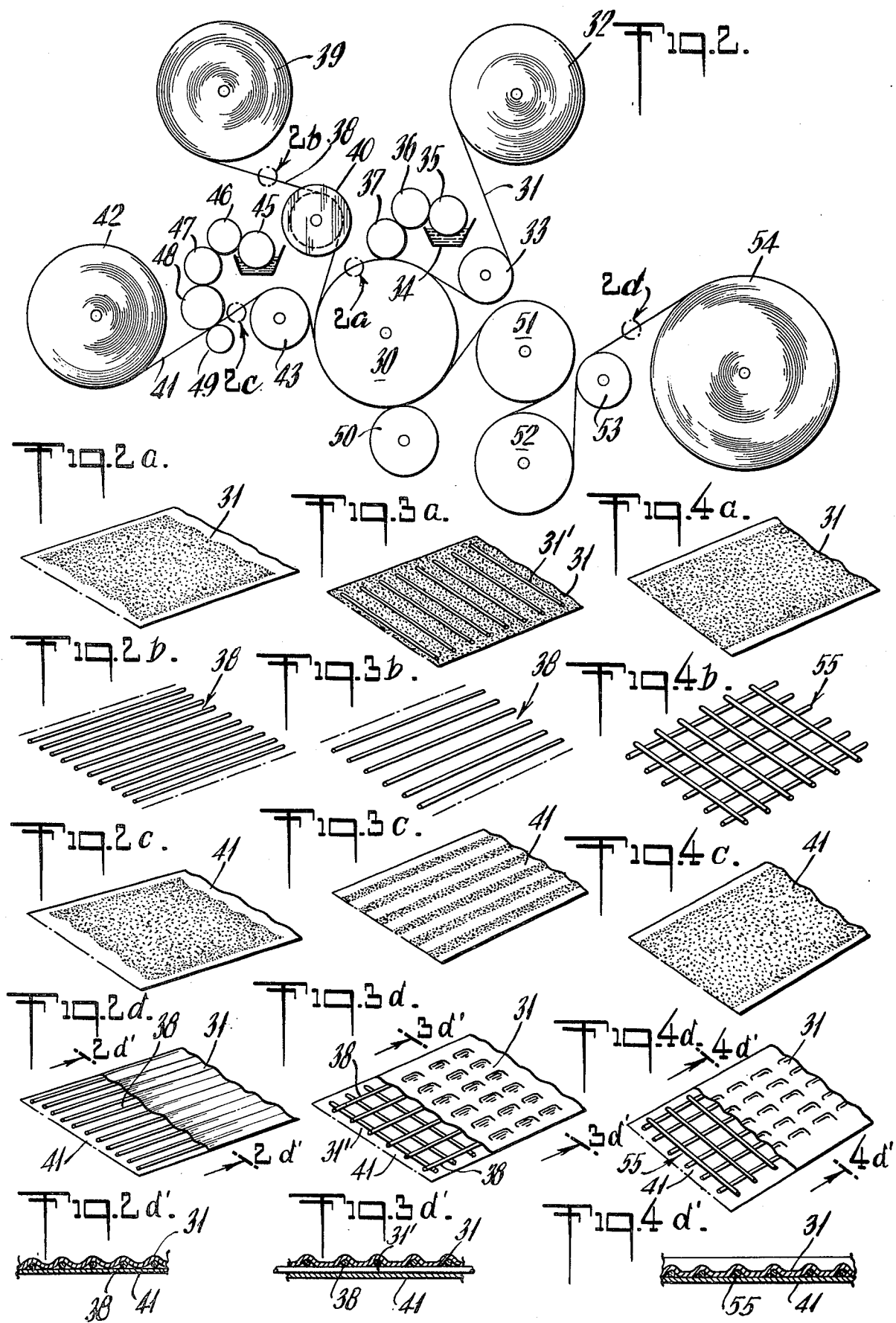

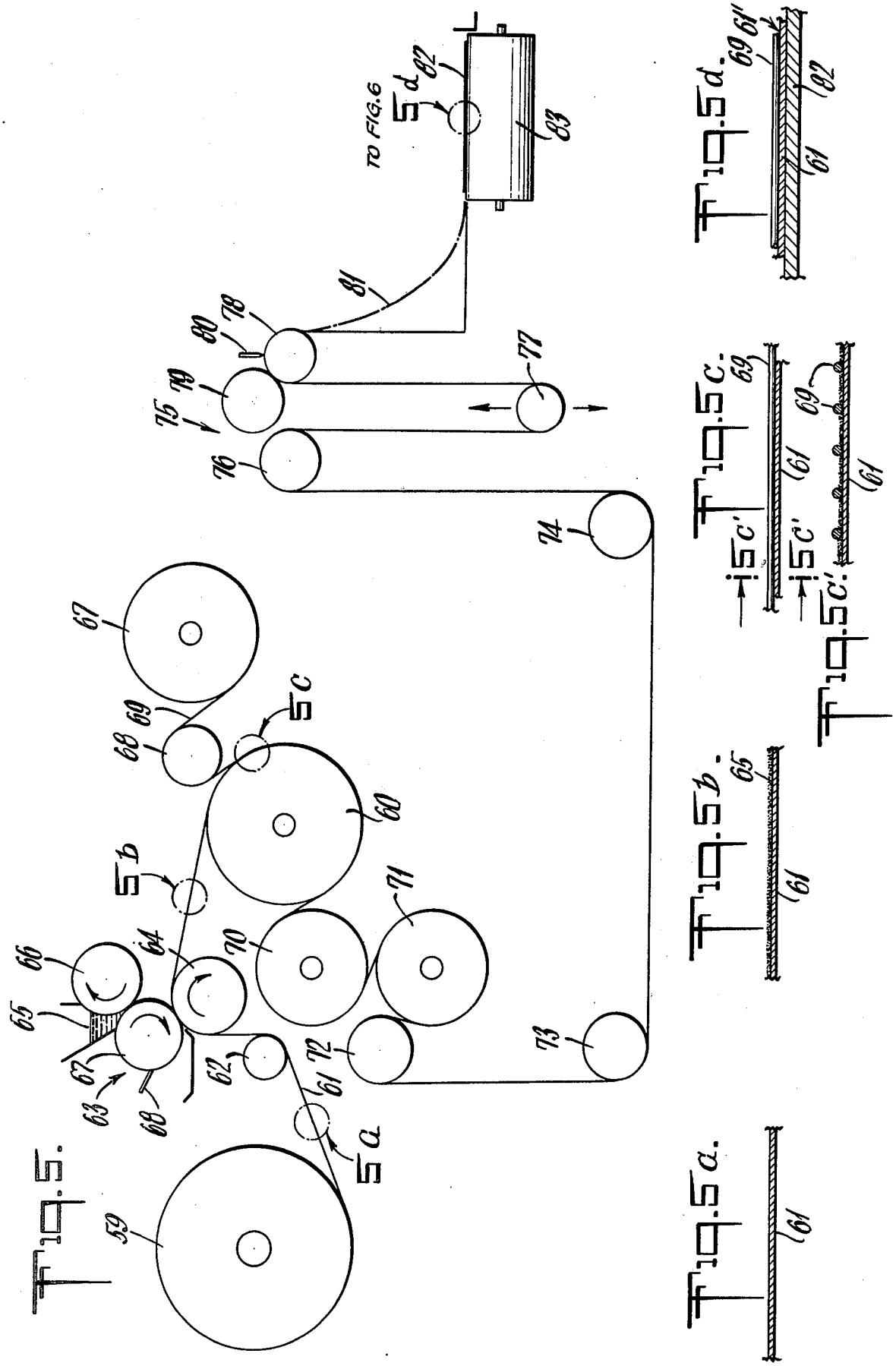

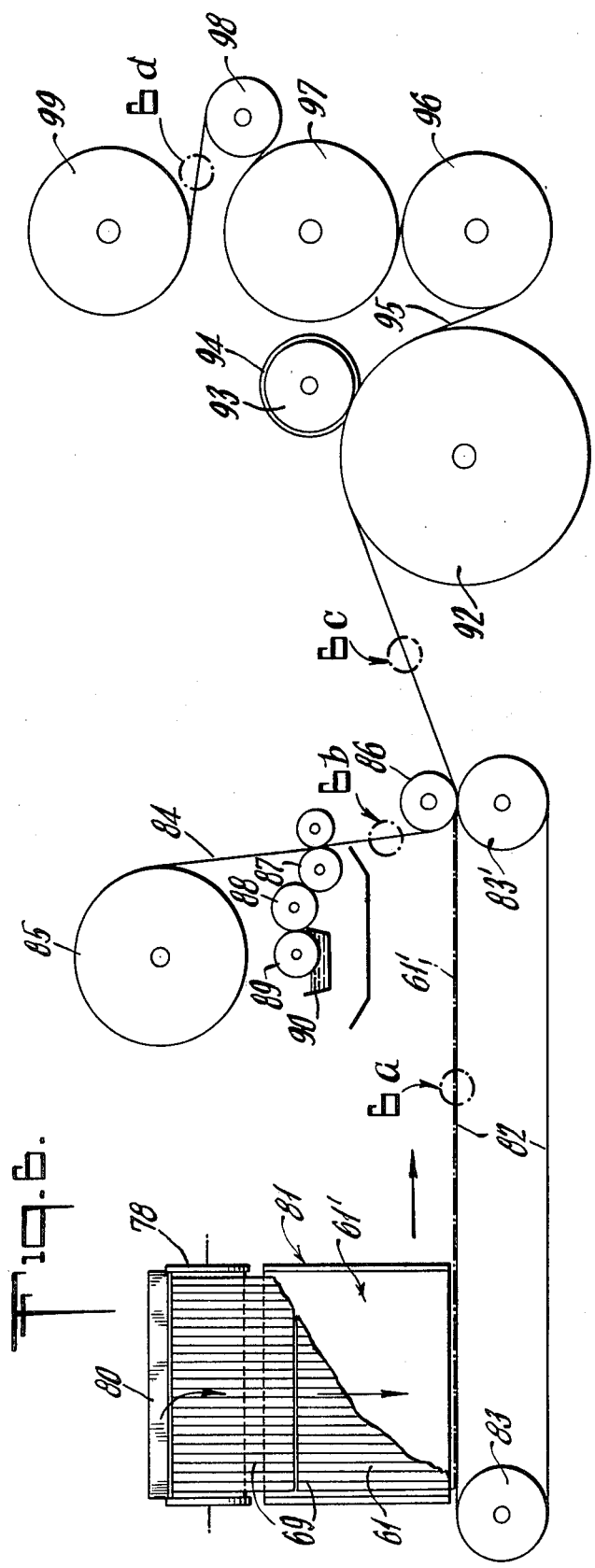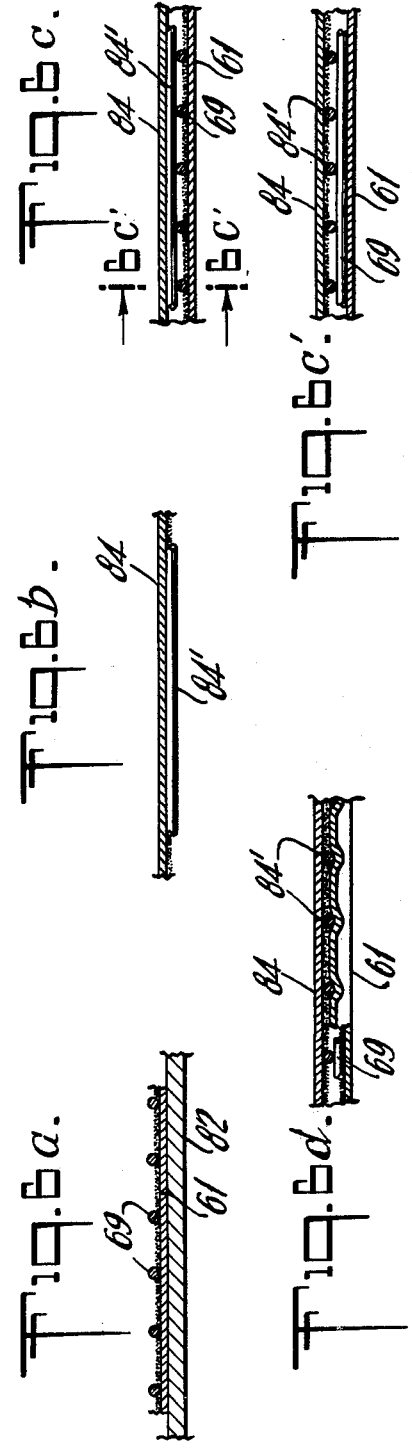

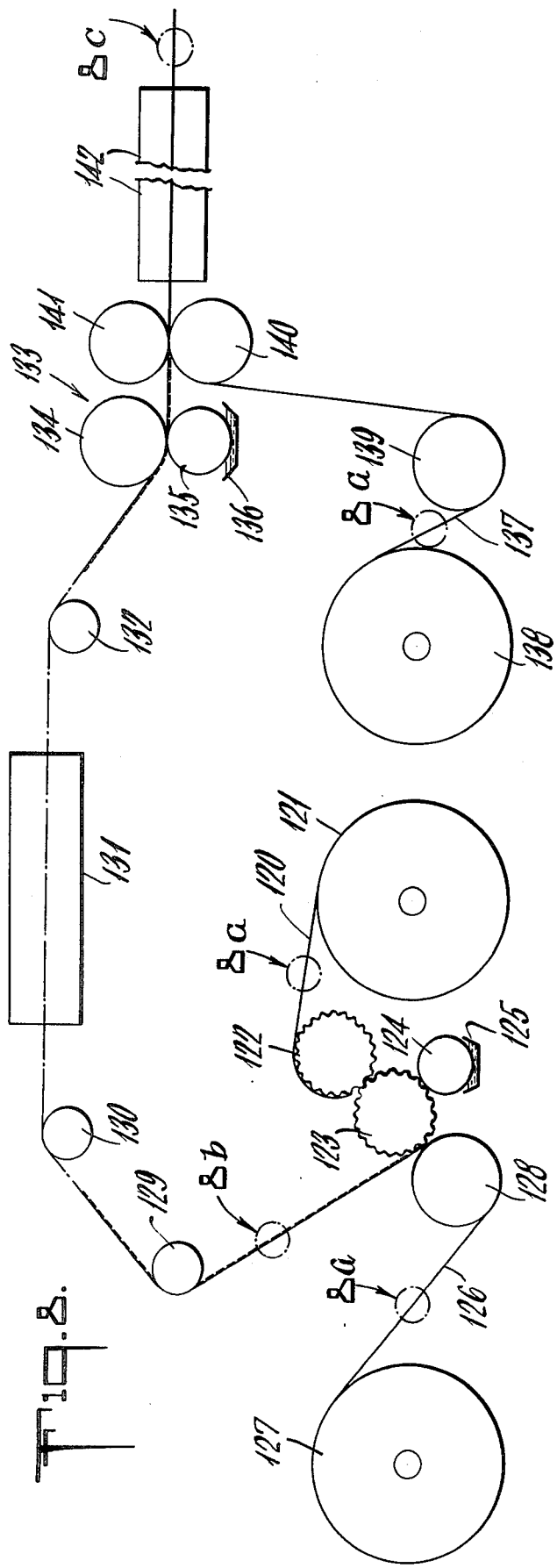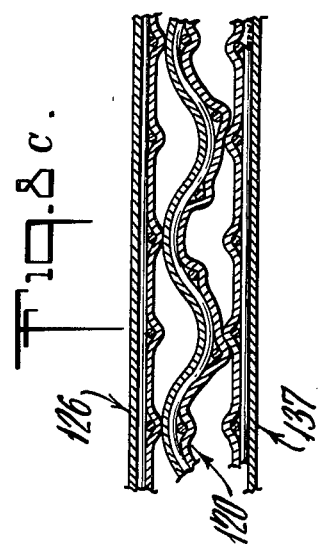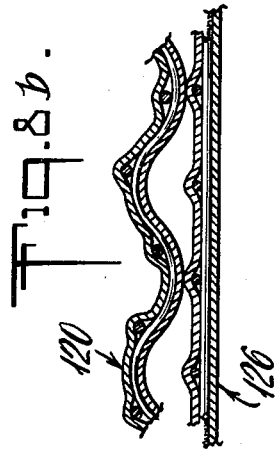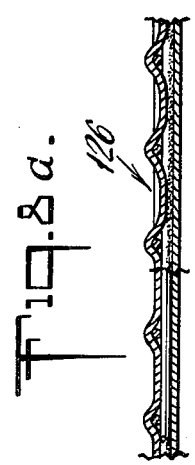

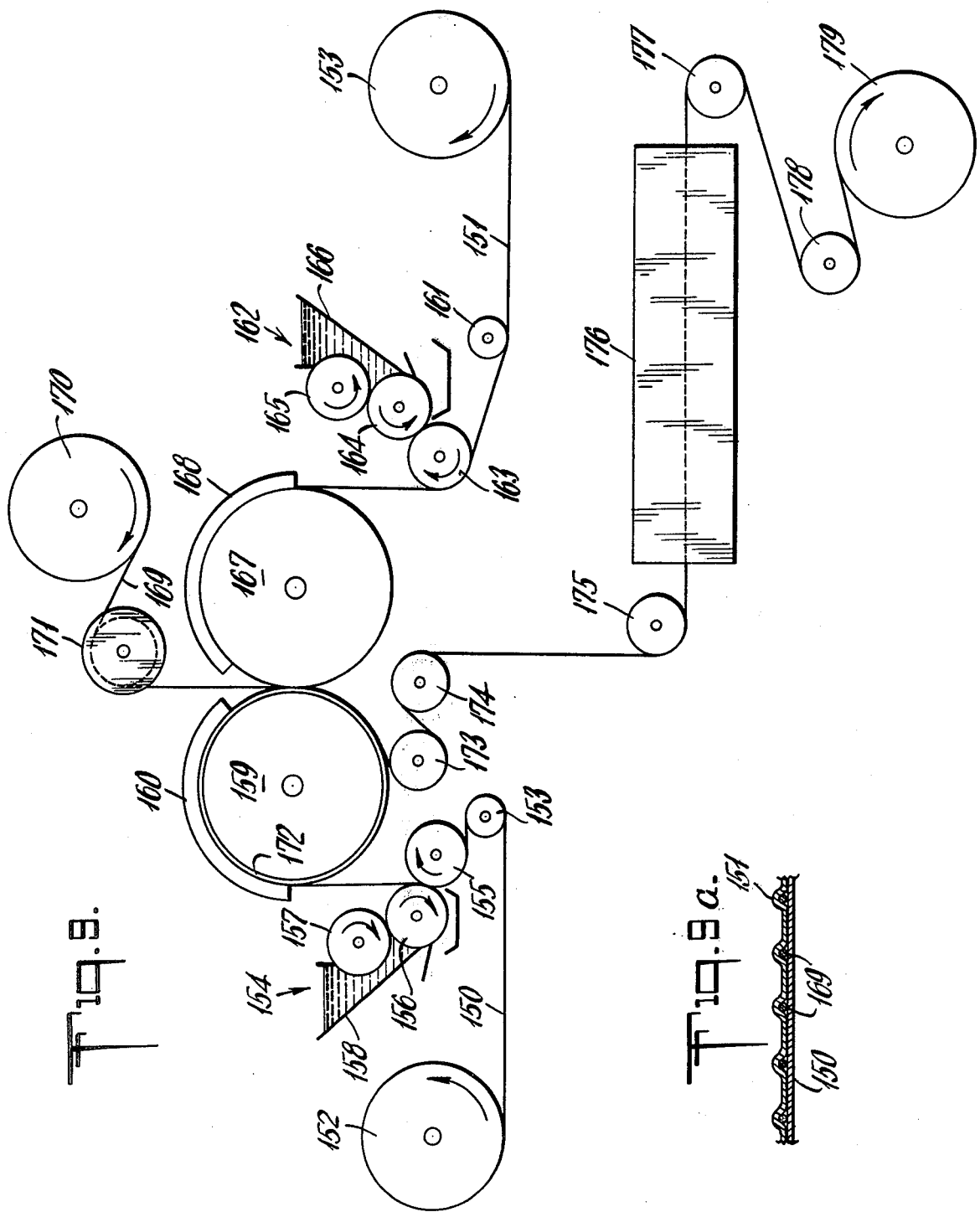

METHOD OF FORMING WIRE REINFORCED CORRUGATED BOARD

This invention relates to novel and improved methods and apparatus for the manufacture of reinforced paper products and corrugated board and to the resultant products.

The utilization of reinforcing elements including various types of fibers have been utilized to strengthen paper products in the past but known fibrous material while affording an increase in tensile strength, do not impart much by way of structural strength as well as added rigidity and stiffness to the finished product. In the case of corrugated board which is made with various weights of paper, increased stiffness and strength have been attained by increasing the weight of the paper utilized for both the corrugated central portion as well as the overlying layers. In fact when heavy packing cases were to be made of corrugated board several layers of the corrugated board had to be laminated in order to attain the desired stiffness and strength. It is well known that corrugated board has been manufactured for many decades yet the only procedures that have been considered economical and practical to obtain increased structural strength and stiffness have involved the use of paper of increased weight and the lamination of layers of corrugated board. It is well recognized however that notwithstanding the utilization of heavier paper and also the lamination of corrugated board that the resultant product is still subject to the adverse affects of moisture which results in substantial softening of the board and loss of the protection intended to be afforded by it.

It has been found that vastly improved corrugated board and other products can be fabricated utilizing relatively thin wire elements of the order of 5 to 12 mils in thickness which afford vastly improved rigidity and strength with little if any increase in cost of manufacture. In fact it appears that with the utilization of wire reinforcing elements disposed within the corrugated board the weight of paper required to achieve strengths greater than that obtainable with present procedures can be greatly reduced. For instance in the manufacture of corrugated board using 26 pound paper with 10 mil wire reinforcing elements in only the corrugated layer, structural strengths can be achieved which are far in excess of those obtainable with conventional corrugated board of equivalent thickness but utilizing 40 pound paper. In fact wire reinforced corrugated board in accordance with the invention has about 3 times the deflection resistance of conventional board using an equivalent weight of paper. Thus this invention affords not only a material conservation of paper but a vastly improved product that can be fabricated at little if any increase in cost. Moreover by reason of the new and improved process in accordance with the invention it is possible to use existing corrugating machinery with only slight modifications to produce reinforced corrugated board.

Another object of the invention involves the provision of novel and improved methods and apparatus for fabricating laminated paper structures embodying wire reinforcing elements which may be utilized directly in the manufacture of corrugated board as well as for a variety of other purposes. It will be observed that the improved reinforced laminated paper affords an unusual advantage in that the introduction of the reinforcing elements produces a contour in the surface of the layer of paper on at least one side thereof that is of such nature as to impart a degree of rigidity to the resultant structure in addition to the rigidity afforded by the reinforcing elements. Thus the rigidity of any resultant product including corrugated board has improved rigidity produced not only by wire elements but also because of the displacement of paper layers.

Still another object of the invention resides in novel and improved apparatus for the manufacture of reinforced laminated paper material that is characterized by its simplicity, ease of high speed of operation and relatively low cost.

Still another object of the invention resides in a novel and improved method and apparatus for producing reinforced laminated materials wherein two sets of perpendicularly disposed wire reinforcing elements can be disposed between overlying layers of paper without the need for weaving or welding the longitudinal and transverse wires prior to insertion between the paper layers.

A still further object of the invention resides in a novel and improved method and apparatus for producing reinforced corrugated board.

A still further object of the invention resides in the provision of improved reinforced laminated paper products which afford a high degree of rigidity and tensile and structural strengths which can be fabricated with little if any additional cost over known laminated materials.

The above and other objects of the invention will become more apparent from the following description and accompanying drawings forming part of this application. In the drawings;

FIG. 1 is a diagrammatic view of one embodiment of the invention for applying a plurality of longitudinal wires to one surface of a paper sheet, FIG. 1a is a plan view of a roller utilized in FIG. 1 for laying a plurality of wires in parallel relationship onto the surface of a paper web, FIG. 1b is a cross sectional view of the paper web of FIG. 1 with the adhesive applied thereto, FIG. 1c is an enlarged cross sectional view of the adhesive coated paper web with the longitudinal wires applied thereto, FIG. 1d is a fragmentary perspective view of one embodiment of a product formed by the apparatus shown in FIG. 1, FIG. 1e is a fragmentary perspective view of modified embodiment of the product formed by the apparatus shown in FIG. 1, FIG. 2 is a diagrammatic view of modified embodiment of the invention for producing a laminate comprising a pair of paper webs with reinforcing elements interposed therebetween, FIGS. 2a through 2d are enlarged perspective views of fragmentary portions of the paper webs and reinforcing wires as shown at positions a through d of FIG. 2 and illustrating the steps in the process of fabricating one embodiment of a reinforced laminate, FIG. 2d' is a cross sectional view of FIG. 2d taken along the line 2d'—2d' thereof, FIGS. 3a through 3d are enlarged perspective views similar to FIGS. 2a through 2d and illustrating the steps in the process of fabricating a modified embodiment of the invention, FIG. 3d' is a cross sectional view of FIG. 3d taken along the line 3d' thereof, FIGS. 4a through 4d are enlarged perspective views of fragmentary portions of paper webs and reinforcing elements similar to FIGS. 2a through 2d and 3a through 3d but illustrating a still further embodiment of the invention, FIG. 4d' is a cross sectional view of FIG. 4d taken along a line 4d'—4d' thereof, FIG. 5 is a diagrammatic view of apparatus for continuously applying longitudinally disposed reinforcing elements to one side of a web and then severing the web into sections and placing the sections in side-by-side relationship with the reinforcing elements disposed transversely of the direction of the movement of the severed sections, FIGS. 5a through 5d are enlarged cross sectional views of the web and the reinforcing elements taken at positions 5a through 5d of FIG. 5.

FIG. 5c' is a cross sectional view of FIG. 5c taken along the line 5c'—5c' thereof, FIG. 6 is a diagrammatic view of apparatus for laminating the sections produced in FIG. 5 to form a structure having longitudinal and transverse reinforcing elements incorporated therein, FIG. 6a through 6d are cross sectional views taken at the positions 6a through 6d of FIG. 6 to illustrate the successive steps in formation of a completed laminate, FIG. 6c' is a cross sectional view of FIG. 6c taken along the line 6c'—6c' thereof, FIG. 7 is a diagrammatic illustration of apparatus, similar to FIG. 6, illustrating a modified procedure for forming a laminate having longitudinal and transverse reinforcing wires therein, FIG. 7a through 7e illustrate the steps in the formation of the laminate of FIG. 7 and constitute enlarged views taken at positions 7a through 7e thereof, FIG. 8 is a diagrammatic view of the apparatus for producing a wire reinforced corrugated material in accordance with the invention, FIGS. 8a through 8c are greatly enlarged cross sectional views of the steps in the process of forming reinforced corrugated board and constitute enlarged views taken in positions 8a through 8c of FIG. 8, FIG. 9 is a diagrammatic view of still another embodiment of the invention for forming a paper laminate having longitudinally disposed reinforcing wires therebetween, and FIG. 9a is an enlarged cross sectional view of the reinforced laminate produced by the apparatus illustrated in FIG. 9.

In the manufacture of paper for use in packaging applications including sealing tapes, fibrous materials have been utilized as they afford a high degree of flexibility and tensile strength. Corrugated board, however, is generally employed in order to provide stiffness and structural strength and fibrous materials would not afford any material advantage. Thus the corrugated board industry has relied on the use of heavy weight paper and the lamination of multiple thicknesses of corrugated board in order to achieve the desired strength and stiffness.

It has been found that it is possible to materially increase the strength of paper and corrugated board through the utilization of wire reinforcing elements which strength is imparted not only by reason of the wire itself but because of the configuration of the resultant laminate embodying the wire elements. It appears that with the utilization of wire reinforcing elements in corrugated board it is possible to obtain as much as three times the structural strength utilizing a moderate weight paper than is obtainable by the strongest paper presently available. Furthermore the invention provides a novel and improved method and apparatus for forming a laminate wherein sets of wires can be disposed both transversely and longitudinally without the need for welding the wires or weaving them as both procedures involve substantial cost. Moreover, it is difficult and costly to form a wire mesh having relatively large apertures of the order of ⅛ to ½ inch. With this invention however the wires can be placed at any desired spacing to achieve a specific objective.

As will become apparent from the following description various procedures may be utilized in formation of reinforced paper products. An initial step in the formation of such products involves the application of wire reinforcing elements to one side of the paper web and this is illustrated in FIG. 1. In this Figure the numeral 10 represents a drum having suitable means for heating it in order to dry the adhesive. A paper web 11, fed from a roll 12, passes about a roller 13 onto the surface of the drum 10. An adhesive contained in a trough 14 is applied by means of rollers 15, 16 and 17 to the surface of the paper. Immediately thereafter a plurality of longitudinally disposed spaced wires 18 are fed from a plurality of spools 19, of which only one is illustrated, about a roller 20 and onto the surface of the adhesive coated paper. The adhesive is dried by the heated roller 10 and an additional heater 21, shown in dotted outline, may also be employed to accelerate the drying or curing process. The resultant product is then fed about cooling rollers 22, 23 and 24 and is wound on the roll 25.

The roller 20 may take any desired configuration in order to maintain proper spacing between the wires and one form of the roller is illustrated in FIG. 1a. It will be observed that the roller consists of a central cylindrical member 26 having a plurality of spaced peripheral flanges 27 in order to insure the maintenance of proper spacing of the wires as they are applied to the surface of the paper web 11. FIG. 1b is an enlarged cross sectional view of the paper web taken at the point 1b of FIG. 1 to illustrate the application of the adhesive thereto, and FIG. 1c is an enlarged cross sectional view taken at position 1c of FIG. 1 showing the longitudinal wires in position on the paper. In FIG. 1d it will be observed that the adhesive denoted by the numeral 14' is applied over the entire area of the web 11 while in FIG. 1e it will be observed that the adhesive 14' is applied in discrete strips so that the amount of adhesive required can be materially reduced. The resultant product as shown in FIGS. 1d and 1e is generally utilized in successive operations for forming a completed laminate. The thickness of the adhesive applied to the web should preferably be of sufficient thickness to grip an appreciable portion of the wires and may be as thick as ¼ of the diameter of the wires.

The apparatus illustrated in FIG. 2 is useful for making several modified types of laminates in accordance with the invention. More specifically the apparatus includes a drum 10 illustrated in FIG. 1. A paper web 31 is fed from the roll 32 and about a roller 33 onto the surface of the drum 30. Adhesive is fed from the trough 34 by means of rollers 35, 36 and 37 and applied to the web 31. The web 31 may either be a paper web as described in connection with FIG. 1 or it may have been previously prepared with a plurality of transversely disposed spaced wire reinforcing elements as will be described in connection with FIGS. 3a through 3d.

A plurality of wires 38 are fed from a plurality of spools 39 about the roller 40, which corresponds to roller 20 of FIG. 1, and onto the surface of the web 31 after the adhesive has been applied thereto. It will become apparent however, as description proceeds, that in place of the wires 38 a preformed wire grill may be utilized if desired in which case the web 31 would not carry the transverse reinforcing wires. After the application of the wires 38 a second web 41 is fed from the roll 42 and for this purpose an adhesive containing trough 44 may be utilized with the adhesive being transferred to the web by rollers 45, 46, 47 and 48. A backup roller 49 is preferably employed in order to insure the application of a uniform layer of the adhesive. The resultant structure upon passing about the roller 30 engages a pressure roller 50 preferably having a resilient surface thereon to urge the two webs in contact one with the other. Thereafter the completed product passes about cooling rolls 51 and 52 and then is guided by roller 53 to the wind-up spool 54.

As pointed out above the apparatus of FIG. 2 is useful for making several different forms of the invention. More specifically it will be observed that one form involves the lamination of two paper webs with longitudinally disposed wires therebetween. This is illustrated in FIGS. 2a through 2d. The first web with the adhesive applied thereto, as shown in FIG. 2a, is an enlarged perspective view taken at point a of FIG. 2. The spaced parallel wires, illustrated in FIG. 2b, are applied to the web 31 and then the second web 41, with an adhesive thereon, as shown in the FIG. 2c, is applied over the wires to produce the resultant product shown in FIG. 2d. A cross sectional view of FIG. 2d is shown in FIG. 2d'. In this case the layer or web 41 follows the contour of the wires while the web 31 is flat. This is the preferred method of forming the laminate since the flat surface on one side is desirable in many applications particularly if the material is to be printed.

A second form of product that may be fabricated on the apparatus shown in FIG. 2 is illustrated in FIGS. 3a through 3d. It will be observed that the web 31 has a plurality of transverse wires 31' adhered thereto. Such a web may be produced by utilizing the product produced by the apparatus shown in FIG. 1. This may be attained by cutting the web, with the longitudinally disposed wires adhered thereto, into sections each having a length equivalent to the width of the web. The sections would then be shifted 90° and attached one to the other to form the web 31' of FIG. 3a. The wires 38 are then placed in overlying relationship with the wires 31' of the web 31 whereupon the second web 41 is applied thereto. This procedure will produce a wire grill as shown in FIG. 3d enclosed between two paper webs and a cross sectional view of FIG. 3d is shown in FIG. 3d'. It will be observed that with the utilization of the grill in FIGS. 3a through 3d that at least one of the webs such as the web 41 is forced into the areas between the wires and in so doing added rigidity and strength is imparted to the resultant structure.

A third product may also be formed by the apparatus illustrated in FIG. 2 and this is shown in FIGS. 4a through 4d. This embodiment of the invention is similar to FIG. 3a except that plain paper webs 31 and 41 are utilized in the same manner as previously described. The wires 38 however, are replaced by a preformed mesh 55 which would be fed from a roll corresponding to the roll 39. The mesh could of course be formed in any suitable manner and may either be in the form shown or any other suitable configuration depending on the strength and rigidity desired. The resultant product is shown in FIG. 4d and a cross sectional view is shown in FIG. 4d'.

In the embodiments of the invention described in FIGS. 1 and 2 various types of adhesives may be employed depending on the characteristics desired in the completed product. One form of adhesive which has been found useful involves a mixture of vinyl and starch. Such a product is manufactured by National Starch and Chemical Corporation and comprises an aqueous solution containing VINAMYL, a chemical modification of starch, CROSREZ, a catalyst, and DURABOND, a chemically modified starch. VINAMYL, CROSREZ and DURABOND are trademarks of the National Starch and Chemical Corporation and one composition may be formed as follows:

| Primary Mixer | |
|---|---|
| A Tap water | 100 gals |
| B Vinamyl | 400 lbs |
| C Heat to 130° F. | |
| D Caustic Soda (dissolved in 5 gallons of water) | 32 lbs |
| E Tap water | 100 gals |
| Secondary Mixer | |
| A Tap water (heated to 85° F.) | 320 gals |
| B Crosrey | 100 lbs |
| C Borax (10 mol) | 30 lbs |
| D Durabond | 1400 lbs |

Then intermix the primary mix into the secondary mix. The adhesive becomes highly resistant to water after being dried and cured and has the advantage that it will tend to swell during the curing process and thus will completely fill all interstices that may exist between the webs and the wire reinforcing elements disposed therebetween and firmly adhere the webs and wires one to the others. Other types of adhesives may also be utilized such as the caseins, hot melts, such as mixtures of resin and wax, and pressure sensitive adhesives which may also include additives to impart a thermosetting quality thereto.

Wire thicknesses of course may vary depending on structural strength required though it has generally been found that wire elements of the order of 5–12 mils in diameter are most effective. Various thickness of paper webs may be used though generally it is not necessary to exceed a 26 lb paper in order to achieve an extremely high degree of strength with wire thicknesses of as small as 5 mils. It is obvious however that when extremely light board is required lighter weight paper and thinner wire may be utilized.

As previously mentioned the fabrication of a wire mesh or grill particularly if woven is not only expensive but exceedingly difficult to fabricate if the mesh sizes are the order to ⅛ tp ¼" and the gage of the wire is less than 20 mils. The form of the invention, shown in FIG. 2, provides a novel and improved method and apparatus for fabricating a laminate embodying transversely and longitudinally disposed wires which form a grid between the two paper layers. A modified form of the invention is illustrated in FIGS. 5, 6 and 7 wherein FIG. 5 illustrates the first step in the process of fabricating the laminate while FIGS. 6 and 7 illustrate alternate procedures for completing the laminate to provide a grill disposed between the paper webs.

Referring now to FIG. 5 the numeral 60 denotes a heated drum which corresponds essentially to the drum 10 as described in connection with FIG. 1. A paper web 61 is fed from a roll 60 about a roller 62 to an adhesive applying station generally denoted by the numeral 63. This station includes a roller 64 over which web 61 passes, an adhesive fountain 65 including a fountain roller 66, and a doctor roller 67 including a doctor blade 68 for metering the adhesive which is applied to the surface of the web. The web then passes on to the roller 60 and a plurality of wires are fed from spools 67 about a roller 68 to apply the wires in precisely spaced relationship to the surface of the adhesive coated web. The roller 68 corresponds to the roller 20 as shown in FIG. 1a. The adhesive is then dried while passing about the roller and if desired additional heating means extending about the surface of the roller as illustrated in FIG. 1 may also be employed to insure thorough drying of the adhesive. Thereafter the web together with the longitudinally disposed wires 69 are fed about cooling rollers 70 and 71. The cooled web then passes about rollers 72, 73 and 74 to a web-length and tension compensator generally denoted by the numeral 75. The compensator includes a roller 76 about which the web passes, a dancer roll 77 which is arranged to move vertically and a cutter roll 78. A pressure roll 79 bears against the cutter roll to maintain the web in contact at all times with the cutter roll and a cutter blade 80 is periodically reciprocated to sever the web into precise lengths. In the instant embodiment of the invention the web 61 with the wires 69 applied thereto is severed into lengths equivalent to the width of the web and each severed length is guided downwardly by chute 81 onto a belt 82 carried by roller 83. The speed of the belt 82 and the speed at which the web 61 is transported are coordinated so that each severed web section is positioned on the belt 82 in substantially contiguous relationship with the previous web section. To achieve this end additional feed rollers may be employed if desired in order to insure proper movement of each severed web section onto the belt 82. If desired severed web sections may also be stacked for processing at a later time.

FIG. 5a is a cross sectional view of the web 61 as it leaves the roll 60, FIG. 5b is a cross sectional view of the web after the application of the adhesive while FIG. 5c is a cross sectional view of the web showing the longitudinal wires disposed thereon. FIG. 5c' is a cross sectional view of FIG. 5c and FIG. 5d is a cross sectional view of a severed web section as it is delivered to the belt 82. Each web section together with the wires disposed thereon is denoted by the numeral 61'.

Referring now to FIG. 6 it will be observed that the cutoff roller 78 and the chute 81 are illustrated in elevation and that the belt 82 is carried by rollers 83 and 83'. It will be observed that each of the severed sections 61' is now possitioned in contiguous relationship with the preceding section on the belt 82 and the wires 69 are not disposed in transverse relationship with reference to the direction of the motion. A second web 84, to which longitudinal wires have previously been adhered, is fed from a roll 85 downwardly and about a pressure roll 86 which urges it against the severed sections 61'. A coating of adhesive is preferably applied to the side of the web 84 carrying the wires by means of rollers 87, 88 and 89, the latter being partially immersed in a trough 90 containing an adhesive. A pan 91 is preferably disposed below the adhesive applying means in order to prevent adhesive from accidentally dripping upon the severed sections 61'. A cross sectional view of the severed section 6' is shown in FIG. 6a while FIG. 6b is a cross sectional view of the web 84 showing the wires 84' adhered to one side thereof. The resultant laminate consisting of outer sheets of paper with longitudinal and transverse wires disposed therebetween is shown in cross section in FIGS. 6c and 6c'. The laminate is then fed about the roller 92 having a cooperating pressure roller 93. The pressure roller 93 has a resilient coating 94 in order to urge the outer layer of paper into firm contact with the wires and also produce some depression of the paper into the areas between the sets of wires. The completed laminate 95 then passes about the rollers 96, 97 and 98 and is wound upon a spool 99.

The adhesive utilized for adhering web 84 with a longitudinal wires thereon to the sections 61' may be of any desired composition. Normally an adhesive is utilized which can be cured rapidly in the presence of heat and under those conditions it may be desirable to heat the roller 92 in order to rapidly cure the adhesive. Accordingly the rollers 96 and 97 may then be in the form of cooling rollers in order to bring the laminate approximately to room temperature prior to rolling. It will also be understood that inasmuch as the severed sections 61' are placed on the belt 82 in contiguous relationship it is not necessary to attach the sections one to the other since they will automatically be adhered to the web 84 and thus form a continuous and substantially uninterrupted layer.

An alternate procedure for laminating the severed sections 61' with a second web is shown in FIG. 7. In this figure it will be observed that the web 61 with the wires 69 thereon has been reversed so that the wires now lie on the underside of web 61 when the severed sections move down the chute 81. For this purpose the web 61 with the wires thereon can be inverted in the course of its transport between the rollers 73 and 74 shown in FIG. 5. Such inversion apparatus is well known in the art and accordingly illustration is not deemed necessary. In place of belt 82 as shown in FIG. 6 a series of uniformly spaced wires 100, fed from plurality of spools 101 and about a spacing roller 102, are fed along the base of the chute 81 so that they will receive and support successive severed sections 61'. The sections will be fed in such manner as to cause them to lie in contiguous relationship on the wires 100. A second web of paper 103 is fed from a roll 104 and an adhesive is applied to the underside thereof by a series of rollers 105, 106 and 107 the latter being immersed in a trough of adhesive 108. The adhesive coated web 103 is then fed about the roller 109 and joins the wires 100 together with the overlying severed sections 61' having transverse wires disposed thereon. The resultant laminate consisting of two outer webs with longitudinal and transverse wires now passes about the roller 110 and into engagement with pressure roller 111 having a resilient coating 112 thereon to urge the outer webs into firm contact with the wires. The resultant structure then passes about the rollers 113, 114 and 115 and is wound on the spool 116. As in the case of FIG. 6 the roller 110 may be heated to accelerate curing of the adhesive in which case the rollers 113 and 114 would be cooling rollers to cool the cured laminate before winding it upon the roller 116. FIGS. 7a through 7e are cross sectional views showing the several stages in the formation of the laminate.

FIG. 8 illustrates an embodiment of the invention for forming corrugated board having the reinforcing wires disposed therein. For purposes of illustration this embodiment of the invention utilizes both longitudinal and transverse reinforcing wires in the corrugated layer as well as in the overlying layers. It is understood however that different types of reinforcing wire arrangements may be utilized to obtain the desired strength and rigidity of the resultant corrugated board. For instance the corrugated layer may embody either longitudinal wires or both longitudinal and transverse wires and similarly the outer layers may be reinforced with one or two sets of wires or if desired the outer layers may merely consist of webs of paper which have not been reinforced. In many applications it has been found that merely providing adequate reinforcement of the corrugated layer will provide the desired degree of rigidity while in other applications, requiring a high degree of rigidity, all three layers may be reinforced.

More specifically and with reference to FIG. 8 a reinforced laminate 120, such as one of the laminates produced by the structures shown in FIGS. 2, 5, 6 and 7, is fed from a roll 121 about a pair of corrugating rollers 122 and 123. The laminate for purposes of this description embodies horizontal and transverse wires and a cross section thereof is illustrated in FIG. 8a. An adhesive is applied to the corrugated laminate by a roller 124 immersed in an adhesive filled trough 125. A second laminate 126 which may be similar to the laminate 120 is fed from a roll 127 and about the roller 128 which bears against the corrugating roller 123 and in so doing produces a structure such as that shown in FIG. 8b. It will be observed that the structures are shown FIGS. 8a and 8b are greatly enlarged for purposes for clarification. The corrugated structure with the laminate applied to one side thereof then passes about rollers 129 and 130 whereupon it is fed through a suitable oven 131 to evaporate the liquid and cure the adhesive.

The corrugated structure with a laminate applied to one side thereof is then fed about the roller 132 to the adhesive applying station 133 consisting of a roller 134 and an adhesive applying roller 135, the latter being immersed in an adhesive containing trough 136. A third laminate 137, which may be identical to the laminates 120 and 126 previously described, is fed from a roll 138 and about rollers 139 and 140, the latter being in contact with the corrugated layer as it emerges from the adhesive applying station 133. A backup roller 141 cooperates with the roller 140 to insure firm contact of the laminate 137 with the corrugated layer. The resultant structure comprising the corrugated layer with laminated layers on each side thereof then passes through a second oven 142 to evaporate liquid and cure the adhesive applied at the adhesive applying station 133. The resultant structure is shown in cross section in FIG. 8c and has been greatly enlarged for purposes of clarification. As previously pointed out the three layers 120, 121 and 137 may include any desired type of wire reinforcement as previously described.

In many instances only longitudinally disposed wires are necessary for the desired reinforcement and the apparatus illustrated in FIG. 9 provides an efficient, relatively high speed process for achieving this end. In this embodiment of the invention paper webs 150 and 151 are fed from rolls 152 and 153 respectively. The web 150 is fed about a roller 153 to an adhesive applying station generally denoted by the numeral 154. The station includes rollers 155, 156 and 157 for applying an adhesive contained in a trough 158 to one side of web 150. The web then passes about a drum 59 having a heating jacket 160 disposed about a portion of its periphery. The drum 159 is preferably heated and jacket 160 is preferably provided with means for the introduction and removal of heated air in order to remove a portion of the liquid contained in the adhesive. When utilizing an adhesive comprising a mixture of vinyl and starch, as previously described, the preheating of the adhesive by the drum 159 and removal of the water vapors by the jacket 160 produces some swelling of the adhesive which is desirable to fill all of the interstices when laminating two layers of paper with wires disposed therebetween.

The second web 151 is fed about a roller 161 and passes adhesive station 162 consisting of rollers 163, 164 and 165 for applying adhesive contained in the trough 166 to the outer side of web 151. The web with the adhesive applied thereto then passes over a heated drum 167 having a jacket 168 disposed about at least part of the periphery thereof. The jacket 168 is substantially identical to jacket 160 previously described and when using a vinyl and starch emulsion as the adhesive a portion of the water is removed and some swelling is produced.

A plurality of wires 169 are fed from spools 170 about an alining drum 171 substantially identical to the drum 20 as described in connection with FIG. 1a. The wires are fed downwardly between the drums 159 and 167 in order to position them between the webs 150 and 151. One of the drums such as drum 159 includes a resilient layer 172 of felt or similar material and two drums urged into firm contact one with the other to apply sufficient pressure to the laminate in order to force the adhesive into firm contact and fill all of the interstices that may result by reason of interposition of the wires between the two layers. The resultant laminate is then fed about rollers 173, 174 and 175 to an oven 176 to finally cure the laminate and remove water that may have penetrated the webs. It is preferable that the ovens 177 further include means for the circulation of air therethrough in order to remove liberated water vapors. The completed laminate reinforced with wires is then fed about the rollers 177 and 178 and is then wound upon the spool 179.

While only certain forms of the invention have been illustrated and described it is understood that modification, changes and alterations may be made without departing from this spirit and scope thereof as defined by appended claims.

What is claimed is:

1. The method of manufacturing wire reinforced corrugated board for packaging comprising the steps of feeding a paper web with an adhesive applied to an outer surface of said web, feeding a plurality of spaced parallel longitudinal wires onto the adhesive coated paper web, setting the wires in firm contact with said web to form a wire reinforced paper web, then corrugating said wire reinforced web transversely of said wires, and adhesively securing a paper web to the crest portions on each side of the corrugated wire reinforced web to form a double faced wire reinforced corrugated board.

2. The method of manufacturing wire reinforced corrugated board for packaging according to claim 1 including the step of adhesively securing an overlying paper web in overlying relationship with said wire reinforced web prior to said step of corrugating.

3. The method of manufacturing wire reinforced corrugated board for packaging according to claim 2 wherein prior to the step of corrugation, said wire reinforced web laminate passes between a pair of rollers wherein at least one of said rollers has a resilient surface thereon.

4. The method of manufacturing wire reinforced corrugated board for packaging according to claim 2 wherein said adhesive on said wire reinforced web is heated and expands to fill the intersticies between said wires and webs.

5. The method of forming a wire reinforced corrugated board for packaging comprising the steps of providing an adhesively coated first web, feeding a plurality of parallel longitudinally disposed wires onto the adhesive coated side of said web, severing said web into lengths to form segmental portions, placing said portions in side by side relationship to form a continuous succession of said portions with the wires extending transversely of said succession, adhesively securing a second plurality of spaced parallel longitudinally disposed wires to a second web, adhesively securing said second web into overlying relationship with said succession of segments with the wires of said second web being transverse to the wires of said succession, setting said adhesive to form the completed laminate with a wire grid disposed therebetween, corrugating said laminate, adhesively securing an overlying paper web to each side of said corrugated laminated to form a double face wire reinforced corrugated board.

6. The method of manufacturing wire reinforced corrugated board for packaging according to claim 5 wherein the steps of adhesively securing a second plurality of spaced parallel longitudinal wires to a second web and adhesively securing said second web into overlying relationship with said succession of segments comprises feeding said second plurality of longitudinal wires substantially horizontal, positioning said segmental portions on said second plurality of longitudinal wires with said transverse wires of said segmental portions being in contact with said second plurality of longitudinal wires, and adhesively securing said second web to said second plurality of longitudinal wires and said segmental portions to form the laminate.

7. The method of manufacturing wire reinforced corrugated board for packaging according to claim 5 wherein said adhesive on said corrugated laminate expands during setting to fill the intersticies between said wires and webs.

8. The method of manufacturing wire reinforced corrugated board comprising the steps of adhering two continuous paper webs one to the other with parallel longitudinally reinforcing wires disposed therebetween to form a laminate, thereafter corrugating said laminate transversely of said wires, adhesively securing an overlying paper web to the crest portions on each of the opposite sides of said corrugated wire reinforced web to form a double faced reinforced corrugated board for packaging.

9. The method of manufacturing wire reinforced corrugated board according to claim 8 wherein said step of adhering comprises adhering two continuous webs one to the other with each web having a plurality of parallel reinforcing wires thereon and the wires on one web being transverse to the wires on the other web to form a laminate with a wire grid therebetween.

10. The method of manufacturing wire reinforced corrugated board according to claim 8 wherein the step of adhering comprises feeding said continuous webs with said plurality of parallel longitudinal reinforced wires disposed therebetween through a pair of rollers, at least one of which having a resilient surface thereon, to adhesively secure said plurality of wires in place between said webs.

* * * * *